(12) United States Patent
Szparagowski

(10) Patent No.: US 11,125,336 B2
(45) Date of Patent: Sep. 21, 2021

(54) SELF ENERGIZED SEAL

(71) Applicant: Freudenberg-NOK General Partnership, Plymouth, MI (US)

(72) Inventor: Raymond L. Szparagowski, Bowling Green, OH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 16/443,844

(22) Filed: Jun. 17, 2019

(65) Prior Publication Data
US 2020/0393046 A1    Dec. 17, 2020

(51) Int. Cl.
*F16J 15/34*    (2006.01)
*F16J 15/32*    (2016.01)

(52) U.S. Cl.
CPC .......... *F16J 15/3436* (2013.01); *F16J 15/32* (2013.01)

(58) Field of Classification Search
CPC ...... F16J 15/3436; F16J 15/32; F16J 15/3204; F16J 15/3232; F16J 15/3228
See application file for complete search history.

(56) References Cited

U.S. PATENT DOCUMENTS

| | | |
|---|---|---|
| 2,729,478 A | 1/1956 | Chambers, Jr. et al. |
| 2,922,668 A | 1/1960 | Haake |
| 3,117,794 A | 1/1964 | Wachal |
| 3,283,823 A * | 11/1966 | Warrington ........... E21B 33/127 166/182 |
| 3,366,392 A | 1/1968 | Kennel |
| 3,897,957 A | 8/1975 | Warner |
| 3,907,309 A | 9/1975 | Griffiths |
| 3,955,859 A * | 5/1976 | Stella .................... F16J 15/3232 384/215 |
| 4,157,187 A | 6/1979 | Kemp |
| 4,184,690 A * | 1/1980 | Brown .................... F16J 15/56 277/515 |
| 4,361,335 A | 11/1982 | Vinciguerra |

(Continued)

FOREIGN PATENT DOCUMENTS

| | | |
|---|---|---|
| DE | 1032629 B | 6/1958 |
| DE | 2448607 A1 | 4/1975 |

(Continued)

OTHER PUBLICATIONS

German Office Action dated Mar. 4, 2021 (corresponding to DE 10 2020 115 160.8).

*Primary Examiner* — Gilbert Y Lee
(74) *Attorney, Agent, or Firm* — Daniel J. Sepanik, Esq.; Harness, Dickey & Pierce, P.L.C.

(57) ABSTRACT

A sealing system includes a housing defining a bore having an internal surface. A rotatable shaft is rotatably disposed in the bore and includes an annular groove disposed in an exterior surface of the rotatable shaft. The annular groove includes a groove bottom and a pair of lateral sidewalls. A seal is formed as a cylindrical annular thermoplastic body having an axial length greater than an axial length of the annular groove and which is bent into a V-shaped cross-section and received in the annular groove so that opposite ends of the seal are disposed in opposite bottom corners of the annular groove. A peak portion of the V-shaped cross section extends radially outward of the annular groove and is engaged with the internal surface of the bore.

13 Claims, 2 Drawing Sheets

(56) References Cited

U.S. PATENT DOCUMENTS

| | | | | |
|---|---|---|---|---|
| 4,438,936 A | | 3/1984 | Schlegel | |
| 4,526,388 A | * | 7/1985 | Marshall | F16J 15/3232 |
| | | | | 277/565 |
| 4,595,206 A | * | 6/1986 | Holzer | F16J 15/3256 |
| | | | | 277/366 |
| 4,676,143 A | * | 6/1987 | Nomura | F16J 15/3228 |
| | | | | 277/451 |
| 4,729,569 A | * | 3/1988 | Muller | F16J 15/164 |
| | | | | 277/584 |
| 5,267,738 A | * | 12/1993 | Vos | F16J 15/062 |
| | | | | 277/641 |
| 8,327,870 B2 | * | 12/2012 | Sidler | F16K 3/0281 |
| | | | | 137/242 |
| 2007/0063451 A1 | * | 3/2007 | Yeager | B29C 45/2608 |
| | | | | 277/566 |
| 2012/0298766 A1 | * | 11/2012 | Szparagowski | F02M 61/168 |
| | | | | 239/1 |
| 2019/0390774 A1 | * | 12/2019 | Jordan | F16J 15/3204 |

FOREIGN PATENT DOCUMENTS

| | | |
|---|---|---|
| DE | 3833689 A1 | 4/1990 |
| DE | 19545172 A1 | 6/1997 |
| DE | 202006013577 U1 | 11/2006 |
| JP | WO2017/146037 A1 | 9/2018 |

\* cited by examiner

SELF ENERGIZED SEAL

FIELD

The present disclosure relates to a rotating shaft seal and more particularly, to a self-energized seal for preventing drain down when the seal system is not pressurized.

BACKGROUND

This section provides background information related to the present disclosure which is not necessarily prior art.

The effect of "drain down" occurs in conventional square cut (i.e. square cross-section) PTFE annular seals used today for sealing between a rotating shaft and a bore of a housing, as these seals allow fluid, when not pressurized, to flow past the seals. The result is fluid will drain when the unit is idle causing issues for restarting and re-pressurizing.

The increased use of start/stop technology requires the ability to keep the fluid in place so as not to have losses and startup issues. Often, accumulators are needed to maintain pressure in these systems to prevent issues like this from occurring.

In addition, transmissions that are built can be filled with fluid and when shipped the units will drain fluid from key areas of the unit. Assembly plants when these units need to be used they have risks of damage from these loss of fluids. Accordingly, it is desirable to provide a sealing system that prevents drain down in order to keep fluids in place and reduce these risks.

SUMMARY

This section provides a general summary of the disclosure, and is not a comprehensive disclosure of its full scope or all of its features.

A sealing system including a housing defining a bore having an internal surface. A rotatable shaft rotatably disposed in the bore and including an annular groove disposed in an exterior surface of the rotatable shaft, the annular groove having a groove bottom and a pair of lateral sidewalls. A seal formed as a hollow cylindrical thermoplastic body having an axial length greater than an axial length of the annular groove and which is bent/folded into a V-shaped cross-section and received in the annular groove so that opposite ends of the seal are disposed in opposite bottom corners of the annular groove and a peak portion of the V-shaped cross section extends radially outward of the annular groove and is engaged with the internal surface of the bore.

A method of making a sealing system includes forming an annular groove in an exterior surface of a shaft, the annular groove having a groove bottom and a pair of lateral sidewalls. A cylindrical annular thermoplastic body is formed having an axial length greater than an axial length of the annular recess. The cylindrical annular thermoplastic body is bent/folded into a V-shaped cross-section annular seal. The V-shaped cross-section annular seal is inserted into the annular groove with opposite ends of the V-shaped cross-section seal disposed in opposite bottom corners of the annular groove and a peak portion of the V-shaped cross-section extending radially outward from the annular groove. The shaft is inserted into a bore of a housing so that the peak portion of the V-shaped cross-section annular seal engages an internal surface of the bore.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
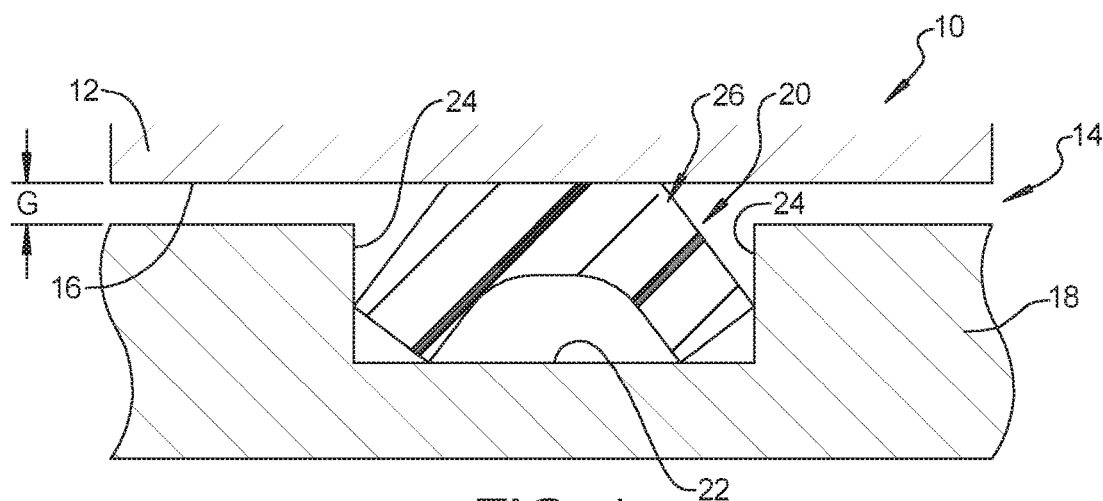
FIG. 1 is a cross-sectional view of an exemplary sealing system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a sealing system 10 according to the present disclosure will now be described. The sealing system 10 includes a housing 12 defining a bore 14 having an internal surface 16. A rotatable shaft 18 is disposed in the bore 14 and is rotatable relative to the housing 12. The rotatable shaft 18 includes an annular groove 20 recessed in the surface of the rotatable shaft 18. The annular groove 20 includes a groove bottom 22 and a pair of sidewalls 24. A seal 26 is disposed in the annular groove 20 for sealing a gap G between the rotatable shaft 18 and the housing 12.

Figure 2:
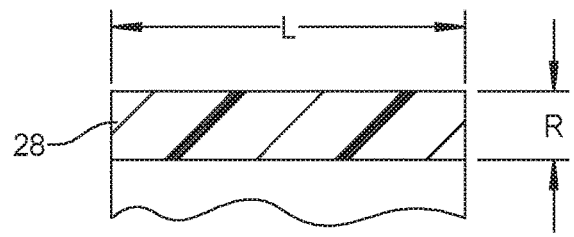
FIG. 2 is a cross-sectional view of a seal formed as a cylindrical annular body having a rectangular cross-section.
Figures 3A, 3B:
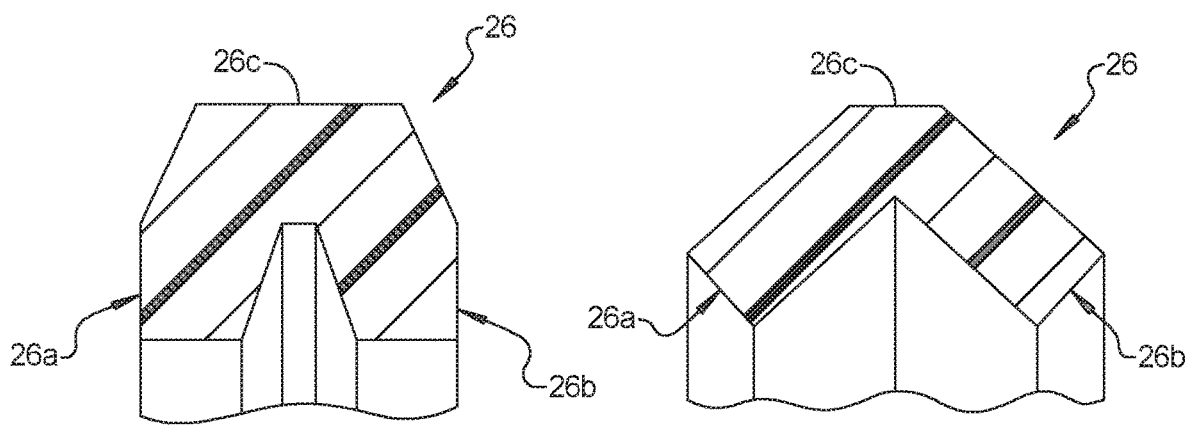
FIG. 3A is a cross-sectional view of an annular seal having a length to thickness ratio of 4.0 and a V-shaped cross according to the principles of the present disclosure.
FIG. 3B is a cross-sectional view of an annular seal having a length to thickness ratio of 5.0 and a V-shaped cross according to the principles of the present disclosure.
Figure 4A:
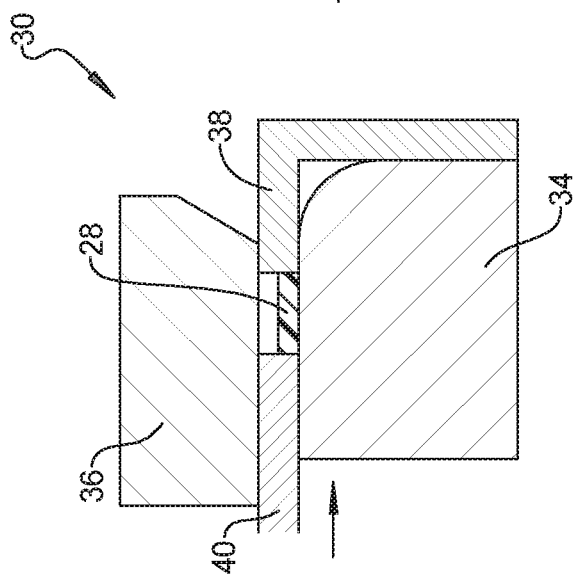
FIGS. 4a-4c are cross-sectional views of an exemplary press-clamp for forming the seal in a V-shape.
Figure 4B:
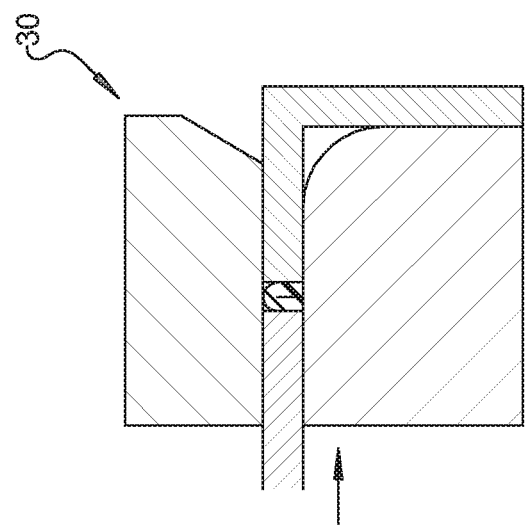
Figure 4C:
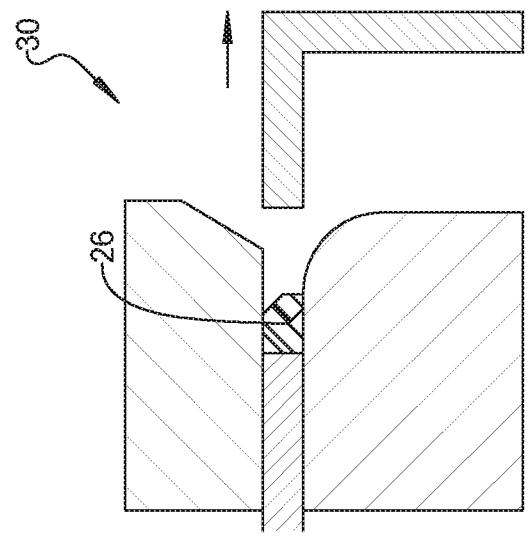

The seal 26 is initially formed from a thermoplastic material, such as PTFE, as a cylindrical annular body 28 having a rectangular cross-section as shown in FIG. 2. The rectangular cross-section of the cylindrical annular body can have an axial length L to radial thickness R ratio of between 2 and 6, and according to a more particular embodiment an L to R ratio, of 4, as shown by the exemplary seal in FIG. 3A or an L to R ratio of 5 as shown by the exemplary seal in FIG. 3B. The axial length L of the cylindrical annular body 28 is longer than an axial length of the annular groove 20. The cylindrical annular body 28 is bent/folded into a seal 26 having a V-shaped cross-section as show in FIGS. 3A and 3B. In one embodiment, the seal 26 can be formed into the V-shaped cross section by inserting the cylindrical annular body 28 into a press-clamp device 30, as shown in FIGS. 4a-4c, having an inner mandrel 34 an outer housing 36, a stop device 38 and piston 40. The cylindrical body is placed on the mandrel 34 within the outer housing 36. The stop device 38 is disposed at one end of the cylindrical body 28 and the piston 40 is pressed toward the stop device 38, as shown in FIG. 4b, to bend/fold the cylindrical body into the v-shaped cross section seal, as shown in FIG. 4c. It should be understood that the dimensions of the cylindrical body 28 and the relative dimensions of the mandrel 34 and outer housing 36 can be designed to provide the seal 26 with the desired shape.

In order to assemble the sealing system 10, the annular seal 26 is formed in the V-shape cross-section and is then inserted into the annular groove 20 in the rotatable shaft 18 so that the opposite ends 26a, 26b are disposed in opposite corners of the annular groove 20 and a peak portion 26c of the annular seal 26 extends out of the annular groove 20. The rotatable shaft 18 is then inserted into the bore 14 of the housing 12 so that the peak portion 26c engages the inner surface 16 of the bore 14.

The sealing system 10 maintains interference to the shaft 18 and bore 14 without pressurized fluid. The seal 26 uses the V-shape geometry to apply force from outer diameter compression to the sidewalls 24 of the annular groove 20. The seal 26 fixes the concern of fluid loss at low to no pressure as opposed to conventional square cut seals in current use. When the seal 26 heats up, it wants to return to its original shape. However, this is prevented with the seal installed into a bore. Accordingly, as the seal heats up it will actually seal better against the groove walls due to this effect. This improves the durability and seal function as compared to machined seals.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A sealing system, comprising:
a housing defining a bore having an internal surface;
a rotatable shaft rotatably disposed in the bore and including an annular groove disposed in an exterior surface of the rotatable shaft, the annular groove having a groove bottom and a pair of lateral sidewalls, wherein the pair of lateral sidewalls of the annular groove in the shaft are at a fixed distance from one another and are non-movably connected to the groove bottom;
a cylindrical annular thermoplastic body having an initial un-deformed state with an axial length greater than an axial length of the annular groove and which in a final state is physically folded over on itself into a V-shaped cross-section seal which is inserted in the annular groove so that opposite ends of the V-shaped cross-section seal are disposed in opposite bottom corners of the annular groove and a peak portion of the V-shaped cross section seal extends radially outward of the annular groove and is engaged with the internal surface of the bore.

2. The sealing system according to claim 1, wherein the V-shaped cross-section seal is formed from PTFE.

3. The sealing system according to claim 2, wherein in the initial un-deformed state, the cylindrical annular thermoplastic body has a rectangular cross-section having an axial length to radial thickness ratio of between 2 and 6.

4. The sealing system according to claim 2, wherein in the initial un-deformed state, the cylindrical annular thermoplastic body has a rectangular cross-section having an axial length to radial thickness ratio of at least 4.0.

5. The sealing system according to claim 1, wherein in the initial un-deformed state, the cylindrical annular thermoplastic body has a rectangular cross-section having an axial length to radial thickness ratio of between 2 and 6.

6. The sealing system according to claim 1, wherein in the initial un-deformed state, the cylindrical annular thermoplastic body has a rectangular cross-section having an axial length to radial thickness ratio of at least 4.0.

7. A method of making a sealing system, comprising;
forming an annular groove in an exterior surface of a shaft, the annular groove having a groove bottom and a pair of lateral sidewalls, wherein the pair of lateral sidewalls of the annular groove in the shaft are at a fixed distance from one another and are non-movably connected to the groove bottom;
forming a cylindrical annular thermoplastic body in an initial un-deformed state having an axial length greater than an axial length of the annular recess;
physically bending the cylindrical annular thermoplastic body over on itself into a V-shaped cross-section seal;
inserting the V-shaped cross-section seal into the annular groove with opposite ends of the V-shaped cross-section seal disposed in opposite bottom corners of the annular groove and a peak portion of the V-shaped cross-section extends radially outward of the annular groove; and
inserting the shaft into a bore of a housing so that the peak portion of the V-shaped cross-section engages an internal surface of the bore.

8. The method according to claim 7, wherein the V-shaped cross-section seal is formed from PTFE.

9. The method according to claim 8, wherein in the initial un-deformed state, the cylindrical annular thermoplastic body has a rectangular cross-section having an axial length to radial thickness ratio of between 2 and 6.

10. The method according to claim 8, wherein in the initial un-deformed state, the cylindrical annular thermoplastic body has a rectangular cross-section having an axial length to radial thickness ratio of at least 4.0.

11. The method according to claim 7, wherein in the initial un-deformed state, the cylindrical annular thermoplastic body has a rectangular cross-section having an axial length to radial thickness ratio of between 2 and 6.

12. The method according to claim 7, wherein in the initial un-deformed state, the cylindrical annular thermoplastic body has a rectangular cross-section having an axial length to radial thickness ratio of at least 4.0.

13. The method according to claim 7, wherein physically bending the cylindrical annular thermoplastic body over on itself into a V-shaped cross-section seal is performed by inserting the cylindrical annular thermoplastic body into a press-clamp.

\* \* \* \* \*